Dec. 16, 1958 J. A. HALL, JR 2,864,167
SYSTEM AND APPARATUS FOR ANALYSIS OF SEISMOGRAPHIC RECORDS
Filed Jan. 20, 1955 4 Sheets-Sheet 1
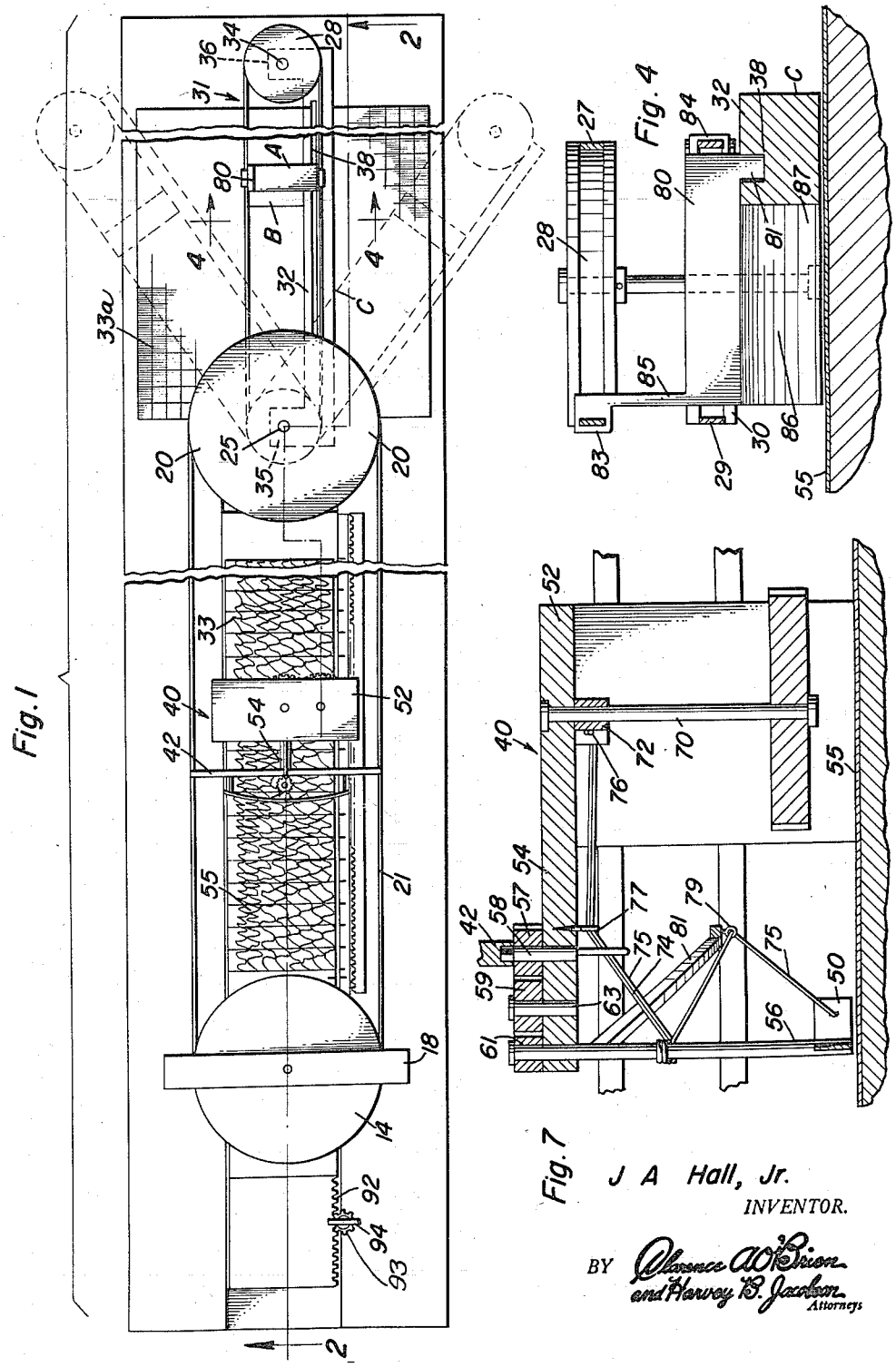
J A Hall, Jr.
INVENTOR.

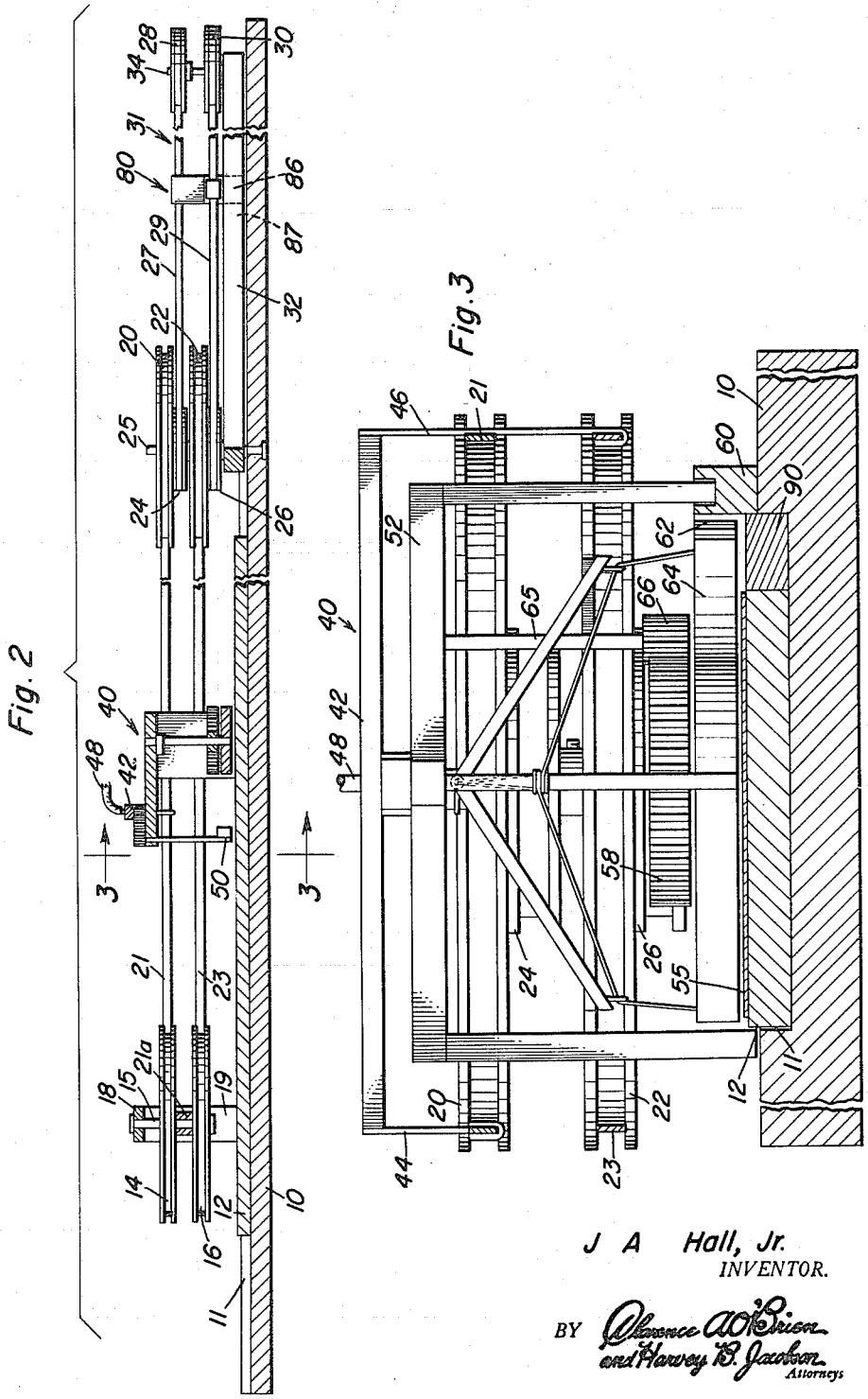

Dec. 16, 1958   J. A. HALL, JR   2,864,167
SYSTEM AND APPARATUS FOR ANALYSIS OF SEISMOGRAPHIC RECORDS
Filed Jan. 20, 1955   4 Sheets-Sheet 3

J A Hall, Jr.
INVENTOR.

BY Clarence A. O'Brien
and Harvey B. Jacobson
Attorneys

Dec. 16, 1958  J. A. HALL, JR  2,864,167
SYSTEM AND APPARATUS FOR ANALYSIS OF SEISMOGRAPHIC RECORDS
Filed Jan. 20, 1955  4 Sheets-Sheet 4

J A Hall, Jr.
INVENTOR.

BY James A. O'Brien
and Harvey B. Jacobson
Attorneys

United States Patent Office 2,864,167
Patented Dec. 16, 1958

2,864,167

SYSTEM AND APPARATUS FOR ANALYSIS OF SEISMOGRAPHIC RECORDS

J. A. Hall, Jr., Jackson, Miss.

Application January 20, 1955, Serial No. 483,015

15 Claims. (Cl. 33—1)

This invention relates to seismographic exploration of the position of geological substrata of the soil and their inclination with a view of obtaining the profile of a section through the earth's crust. Such sections or profiles are required in prospecting for oil, ores and other minerals. The invention more particularly relates to reflection seismography and to a system and device for interpreting and analyzing the seismographic records and for deriving from them exact data necessary for determining the location of the various substrata, their dip, and other pertinent information.

In reflection seismography, as usually practiced for the purpose of geophysical exploration of the subsoil, the customary procedure is to cause seismic disturbances by setting off an explosive charge or charges at a shot point or a series of shot points carefully spaced with respect to each other, and to pick up the wave trains produced by such disturbances by means of microphones, seismo-pickups or geophones arranged at a plurality of points which are carefully spaced from each other and from the shot point, the pattern along which a group of seismo-pickups or geophones are set being called a "spread."

Geophones are detectors of the transducer type capable of translating mechanical vibrations into electrical oscillations and customarily the individual detectors are connected with a suitable electric amplifying apparatus and circuit, the output of which is connected to a moving coil mirror galvanometer. The galvanometers are arranged in a battery and throw light rays from a light source onto a sensitized paper strip or film, thus producing a number of traces or tracks simultaneously on said strip or film, each trace or track corresponding to the seismic vibration pattern received and reproduced by a particular geophone detector.

The strip of recording paper or film is moved longitudinally at a constant speed during the recording. It is provided with transverse time marker lines so as to make it possible to determine on the strip or film the instant of the shot and the time of arrival of any particular seismic wave front or vibration at a geophone detector.

A seismic disturbance will of course be propagated in every direction, but some of the wave energy will travel downwardly and will be reflected at the more or less well defined boundaries of the different strata existing below the surface.

The arrival of the reflected energy will be detectable on the record, although such detection is a difficult operation in view of the fact that the traces show rather continuous random disturbances resulting form energy reaching the geophones directly or by refraction or by horizontal reflections in the weathered layer which are due to breaks in the surface layer, or which are mainly due to extraneous sources.

The arrival of a wave front due to reflection in any detector depicts itself on the record as a transient of a form and duration depending on the electrical characteristics of the recording channels. Therefore, a reflection can be identified by the time sequence, as the wave front appears in the traces as an echelon of transients, each transient stepped out in time from the transient in an adjacent trace by an amount determined by the position and inclination of the stratum from which the reflection starts.

It is thus clear that the identification of a reflection is rather difficult and is usually not possible on a single trace, but is only possible by comparative analysis of all the traces relative to time sequence of transients due to a disturbance and to the amplitude of the transient oscillation which is superposed on the continuous random oscillations.

Many methods have been proposed to facilitate the identification of the reflected wave. Most of these methods involve either filtering of the oscillations or mixing of the same or summation or integration in order to eliminate the random oscillations and in order to detect the energy coming from one direction. The filtering methods however change the wave form and require a most complex equipment and an elaborate adjustment. Integration methods involve the use of highly skilled persons and of much time and the mixing of oscillations in order to cancel the "noise" deprives usually the operator of the possibility to inspect the entire record and thus leads to the overlooking of many transients due to reflection.

The invention consists of a system in which the original records and the usual picking methods by visual inspection are used, but which greatly facilitates the picking of reflections by using picking means so shaped that they indicate the normal "step out" line of the detectors on the record strip for a reflection on a horizontal surface. The "step out" is the interval of time elapsing between the arrivals of the same disturbance wave front at different horizontally spaced detectors and the "step out" line is a line drawn across the record and connecting the points on the traces marking the arrivals of the same disturbance wave front at different detectors. This "step out" is variable, as the influence of the horizontal spacing of the detectors diminishes with increasing vertical distances of the reflecting boundary layers and therefor at different points of the traces, representing different times, the "step out" of the detectors is different and the step out line is differently shaped and inclined.

The system according to the invention facilitates the recognition of transients having the proper sequence of arrival times at the detectors by providing a member which is movable over the traces and which adopts automatically the shape of the "step out" line and changes its shape during its movement over the traces of the records. Further, the said member also can be aligned with any actual "step out line" which may be found on the traces of the record, the movement necessary to effect such alignment, starting from the position of the step out line for reflection on a horizontal stratum, indicating directly and being proportional to the inclination of the reflecting stratum relatively to the horizontal.

The system according to the invention is carried into effect by means of an apparatus having a movable picking head adapted to be moved over the record and being provided with a flexible member, capable of changing its shape, said shape being automatically adjusted during travel of the picking head so as to be always in conformity with the normal "step out" of the geophone detectors upon arrival of a reflection from a horizontal stratum during such movement.

Further, the said picking head and flexible member are so mounted that they may be rotated to adopt any inclined position, in order that they may be aligned with an actual step out line located on the record. The translatory as well as the rotational movement of the picking head and flexible member is transmitted to a plotting head whose movements are in exact proportion to the movements of the picking head and which moves over a cross-section sheet on which the various positions of the picking head when locating reflections may be marked and registered. In this manner the picking of reflections is greatly facilitated and the exact position and inclination of the picking head, corresponding to the position and inclination of the reflecting stratum can be immediately registered.

By way of example the invention is illustrated in the accompanying drawing showing one embodiment thereof. It is however to be understood that the embodiment shown intends to illustrate the principle of the invention and the best mode of applying said principle. The means illustrated is not the sole means for carrying this principle into effect and a departure from the specific construction as illustrated in the drawings is therefore not necessarily a departure from the essence of the invention.

In the drawings:

Figure 1 is a plan view of the device.

Figure 2 is a partly sectional elevational view, the section being taken along line 2—2 of Figure 1.

Figure 3 is an elevational sectional view of the device, the section being taken along line 3—3 of Figure 2.

Figure 4 is a sectional elevational view of the device the section being taken along line 4—4 of Figure 1.

Figures 5 and 6 are both plan views of the scanning head, Figure 5 showing the scanning head in its normal position while Figure 6 shows the scanning head when rotated or swung out by the operator.

Figure 7 is an elevational sectional view through the scanning head the section being taken along line 7—7 of Figure 5.

Figure 5:
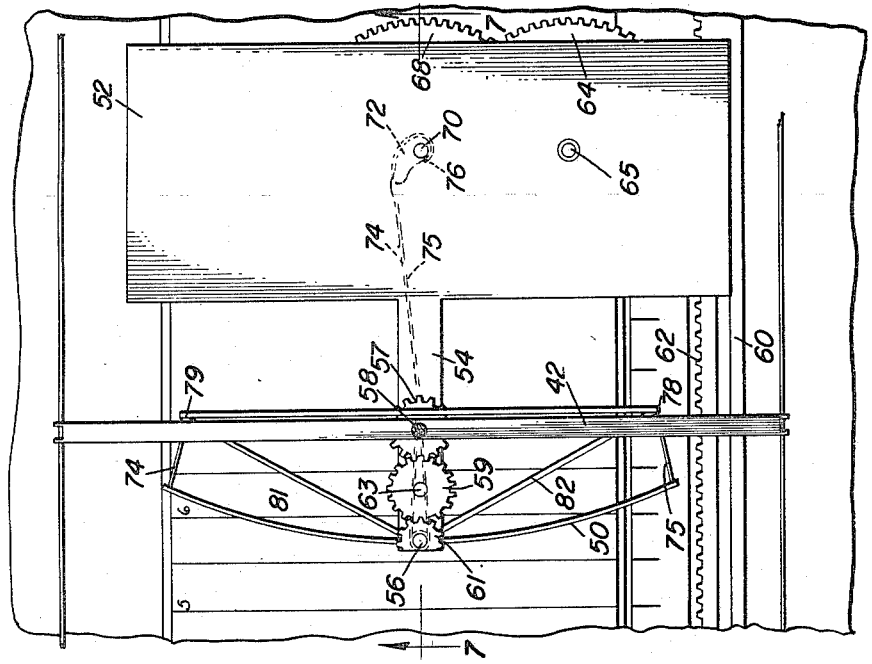

According to the invention the reflection plotting apparatus as illustrated in Figures 2 and 3 comprises a baseboard or table 10, provided with a recess or depressed portion 11 holding a record board 12 supporting a record strip 55 or film to be analyzed. This record strip shows a number of traces or tracks each produced by one of the seismo-pickups or geophones. On one end of the device a pair of pulleys 14, 16 is mounted. These pulleys are coaxial and are mounted on the same spindle or axle 15, but the pulleys are freely rotatable on said spindle and may therefore move independently of each other. Preferably the pair of pulleys 14, 16 with the spindle or axle 15 are suspended above the record board 12 so that free space remains between the lowermost pulley and the record board through which space the record strip 55 may be drawn.

In order to support the spindle 15 and the two pulleys 14 and 16 a cross beam or bridge 18 is provided, having legs 19 mounted on the baseboard on both sides of the record board 12. The pulleys 14 and 16 are preferably spaced on the spindle 15 by means of a spacer disk or sleeve 21a.

A second pair of pulleys 20, 22 of the same size as the pulleys 14 and 16 is arranged near the other end of the record board, and these pulleys are mounted for free rotation on a spindle or axle 25 which may be held on the baseboard and which carries also another pair of pulleys 24, 26 of smaller diameter for a purpose described below.

Each of the small pulleys 24, 26 is fixedly attached or coupled with one of the larger pulleys 20, 22, the pulley 24 being attached to pulley 20 the pulley 26 being attached to pulley 22.

The pulleys 20 and 22 are arranged at the same height above the baseboard at which the pulleys 14 and 16 are arranged and an endless belt, cord or cable 21 joins the pulleys 14, 20 while a similar belt 23 joins the two lower pulleys 16, 22, respectively. The pulleys 14, 20 and 16, 22 will thus move to the same extent when one pulley of these pairs is moved in either direction.

The two smaller pulleys 24, 26 are as best seen in Figures 1, 2 and 4 connected by endless belts, cords or cables 27, 29 with a pair of pulleys of exactly the same size 28 and 30 respectively, which are mounted on the end of a plotting arm 32, forming part of a plotting assembly generally indicated at 31. The two pulleys 28, 30 are mounted on the plotting arm 32 by means of a spindle 34 held by the arm 32 on which the pulleys are freely rotatable.

The plotting arm 32 is pivoted to the baseboard 10 and is freely movable around its pivot which is formed by the spindle 25 which also carries the pulleys 20, 22 and 24, 26. The arm is preferably arranged on one side of the line joining the axes of the spindles 25 and 34 and has laterally projecting heads 35, 36 at both ends which are provided with bores. Through the bore in head 35 the spindle 25 passes, said spindle being held by appropriate means in the dashboard 10. The spindle 34 is carried by head 36 of the plotting arm 32. The latter is further provided with a longitudinal groove 38 (Figure 4) which extends between the said heads 35, 36 for a purpose described below.

The arm 32 as will be noted moves freely over the baseboard 10 around its pivot 25 and there is sufficient space left between the plotting arm and the baseboard to insert a cross-section sheet 33a which lies flat on the baseboard where the plotting arm 32 may move over said sheet.

Between the two sets of pulleys 14, 16 and 20, 22 a scanning head, generally indicated at 40 is inserted (Figures 1, 2, 3, 5, 6, 7). The scanning head comprises a transverse scanning bar 42 so arrnaged as to be normally at right angles to the belts, cords or cables 21 and 23. This bar is provided with clamping fingers 44, 46 at its ends, one end of the scanning bar being thus fixedly connected with belt 21 while the other end is fixedly connected with belt 23 (see Figure 3). The transverse scanning bar is moreover provided with a handle 48 which the operator may seize in order to turn the scanning bar through the desired angle. The scanning element proper is formed with a scanning template 50 which consists of a curved leaf spring the shape of which may be adjusted in a manner described below. The leaf spring is close to or slides on the record strip 55 which is placed on the record board 12 in order to be analyzed by the operator. Its normal curvature corresponds to the normal "step out" of the geophones. As already explained the "step out" is a time differential between the arrivals of the same disturbance waves at the different geophones which are spaced and aligned along a base line or along base lines on both sides of the shot point. The parallel traces or tracks on the record strip made by the geophones therefore register a disturbance at points on the track which are differently located relatively to a transverse time line on the record strip. If the traces or tracks on the record strip are spaced from the middle of the record strips approximately in proportion to the spacing of the geophones relatively to the starting point the points at which the arrival of the same disturbance are normally recorded on different traces will all define a curve on the record strip. The scanning template 50 is bent so as to reproduce the step out curve in its normal position (see Figure 1). This applies essentially to uncorrected records. Records may, however, be corrected for weathering, elevation, and finally, also, for the normal step out. The latter correction when applied eliminates the curved step out line and produces a substantially straight step out line. The template thus permits to scan uncorrected records as well as corrected records.

The shape of the scanning template 50 is variable. To vary the curvature of the template the scanning head is provided with an essentially U-shaped slidable support 52 (Figures 3, 5, 6, 7), from which an arm 54 projects, through the outer end of which a spindle 56 passes. The spindle is either slotted or flattened at its lower end and the middle section of the leaf spring template 50 is fastened to the slotted or flattened portion. The projecting arm 54 moreover also carries another spindle 58, projecting upwardly, the upper end of which supports the transverse scanning bar 42 which is coupled with it for rotation.

Figure 6:
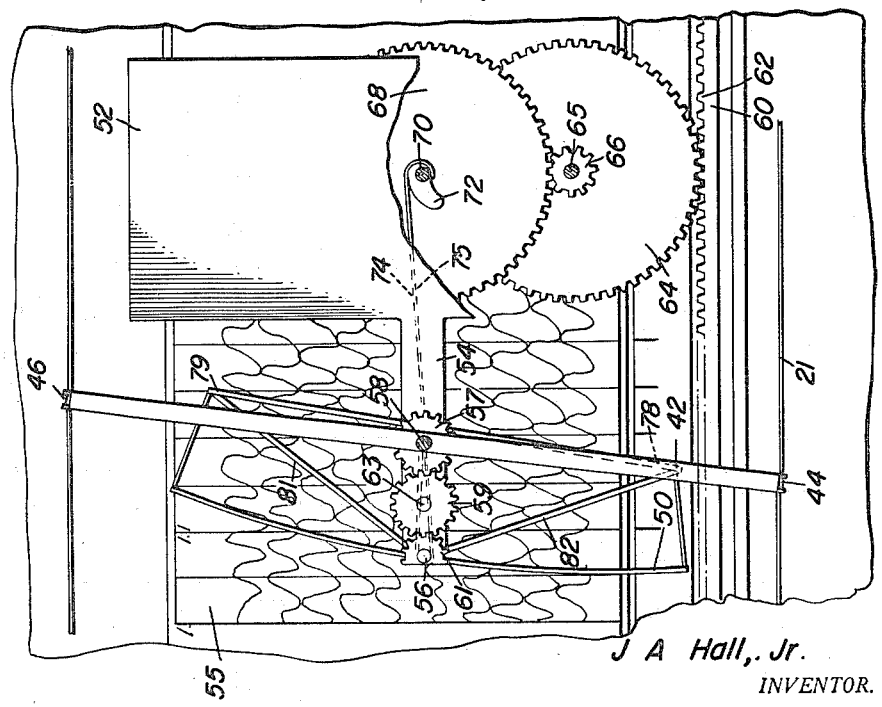

The side members of the U-shaped support may slide on the baseboard 10 or preferably, as shown in Figure 3, one of these side members slides in a grooved guide 60 fixed on the baseboard 10 the inner surface of which carries a rack 62 (see Figures 5, 6). The rack meshes with a toothed wheel 64 rotating with a spindle 65 which is held by the support 52. The toothed wheel 64 is coupled with a pinion 66 which is also keyed to the spindle and which meshes with a toothed wheel 68 keyed or otherwise fixed to a spindle 70 held in a suitable bore of the support 52. The spindle 70 also carries a cam disk 72 to one side of which two cables 74, 75 are fixed, which cables pass over the cam disk. The cam disk may be fixed on the spindle by means of a setscrew 76 or a similar device. The cables 74, 75 run through an eye or eyes 77 (see Figure 7) fixed on the projecting arm 54 of the U-shaped support 52 and are then wound around the spindle 56 from whence they further run through the eyes of eyebolts 78, 79 (Figures 5, 6, 7) which are carried by the inclined supporting struts 81, 82 projecting downwardly from the spindle 56 to which they are fixed.

After having passed the eyes 78, 79 the cables 74, 75 are attached to the ends of the leaf spring 50. It will thus be clear that if the cables 74, 75 are tensioned by the cam disk 72 the ends of the leaf spring 50 are bent back, and if the cam disk loosens the tension of the cables the leaf spring is permitted to flatten itself.

Such tensioning or loosening is clearly the consequence of a rotation of the cam disk 72 which rotation is imparted to it when the scanning head is moved along the record strip. A movement of the scanning head towards the bottom of the record strip (towards the right in Figure 6) relaxes the spring tension and produces a flattening of the leaf spring, while the movement towards the top of the strip (towards the left in Figure 6) tensions the spring and accentuates its curvature.

On the top of the scanning head and keyed to the spindle 58 which is rotatively coupled with or secured to the transverse scanning bar 42, a toothed pinion 57 is arranged which meshes with a second pinion 59 mounted on an axle 63 held by the projecting arm 54. The toothed pinion 59, in its turn, meshes with the toothed segment 61 keyed to the spindle 56 which carries the template 50. Preferably the pinions and the segment 61 are exchangeable. When the handle 48 is moved by the operator, the template and the structure connected with it swings out with a much higher speed, thus permitting the operator to view the record sheet, if need be. Further, the gears also serve the purpose of determining the velocity of migration. If a higher migration velocity is desired a smaller gear is inserted replacing pinion 57 and a larger segment is mounted on spindle 56 replacing segment 61. Then the template will only perform a fraction of the movement imparted to the scanning bar by the operator.

The plotting assembly 31 (Figures 1, 2 and 4), comprising the plotting arm 32, the pulleys 24, 26, the belts, cords or cables 27, 29 and the pulleys 28, 30, also comprises a plotting head 80 which consists of a head block transversely arranged relatively to the belts 27, 29 and provided at its lower end with a feather, tooth or projection 81 engaging the groove 38 of the plotting arm 32. Further, the head is provided with clamping means 83 and 84 which clamp one end of the head to the belt 27 and the other end to the belt 29. The head is best arranged close to the plotting arm engaging the grooves therein. The clamp 83 is preferably mounted on the finger 85 projecting upwardly.

On its lower end the plotting head may be provided with a projecting member 86 having a beveled edge 87 which reaches down to the cross-section sheet and which may serve as a straight edge or ruler marking the position of the head on the cross-section sheet below if a pencil is applied against the straight edge 87.

It will be seen that any movement of the scanning head will entail a movement of the plotting head. When the scanning head is moved to the left or right along the record, the plotting head will be moved in proportion, the extent of this movement being defined by the ratio of the diameters of the pulleys.

When the scanning bar is turned, as one of its ends is attached to the belt 21 and the other is attached to the belt 23, these belts will be moved in opposite directions and therefore also the pulleys 20, 22 will move in opposite directions, moving with them the two pulleys 24 and 26 of the plotting assembly 31. The plotting head has the tendency to turn, but because the feather projection 81 engages the groove 38 on the plotting arm, the plotting head cannot turn relatively to the arm but the plotting arm 32 can turn and can move the entire plotting assembly through an angle which is proportional to the angle through which the scanning arm was moved. The position of the plotting head may then be marked on the cross-section sheet in the manner above indicated.

As will be clear all systems need two data to migrate and plot a reflection, one of these being a linear and the other being an angular function. The indication furnished by the apparatus, as will be clear from the operation explained below, is in polar coordinates, the linear function in this case being the total corrected time elapsed which corresponds to the radius vector plotted on the plotting sheet and the angular function being $\Delta t$ or the difference of (corrected) time between two reflections.

It has already been mentioned that the record strip is provided with transverse time marking lines 33 and it is of great importance to fix exactly the starting point. In order to be able to interpret the record it is therefore preferable to have a graduated scale 90 arranged below the record board 11 the zero point of which provides the exact starting point. This starting point is fixed on the device and is the point where the scanning template should be at zero and where the plotting head would be at zero on the cross-section sheet. The record strip 55 is so inserted that the graduation scale is brought into alignment with the time markings on the record strip or film and that the zero point of the record strip coincides with the zero point of the graduation scale. Preferably the graduation scale is slidable on or along the record board 12. To adjust the zero point the record board is preferably provided with a rack 92 which is engaged by a small pinion 93. The pinion is connected with a key 94 which may be operated by the operator in order to adjust the zero point whenever it is found that there is a slight difference between the scale on the record and that on the device. The operator may correct this difference by operating the key with his left hand, while his right hand seizes the handle 48 of the plotting head.

As well known a certain number of corrections have to be made, some of which are usually taken care of by substituting a computed zero point for the actual zero point. Further all the disturbances propagated solely through the weathered layer in a substantial horizontal direction whether accompanied by a reflection or not are substantially without interest during reflection shooting intended to map a cross-section. Also as the configuration of the terrain is rarely such that the geophones may all be placed on the same level relatively to the shooting point, corrections for altitudes have to be made. As these corrections are not part of this invention they are not here described although they may be applied in the same way in which they are applied in connection with other methods. In the present case some corrections for instance those for altitude may be applied by changing either the shape of the template or by providing it with a dip at that point or those points where the step out line would show an irregularity (due to altitude for instance). If the normal step out is included in the correction, the apparatus may of course be much simplified as the curved member and its adjustment becomes unnecessary.

Such as shown the device is set up for water or offshore operation where there is no weathered layer and the altitude of all seismo-pickups is the same.

Operation

Figure 8:
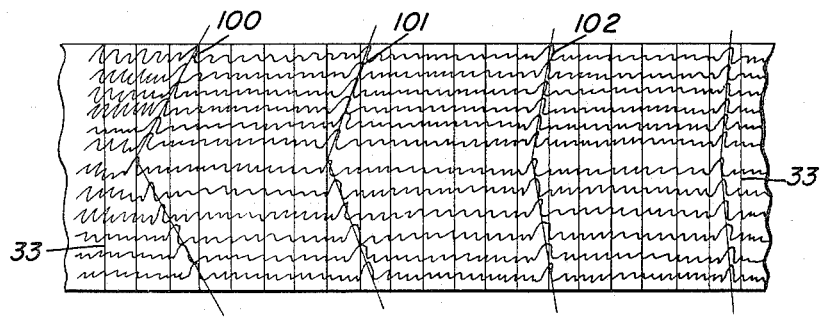
Figure 8 is a view of the record strip or film.

As above explained the customary record strip or film (Figure 8) contains a plurality of oscillogram traces (between 6 and 24) each trace picturing the vibrations received by one of the geophones upon reception of a section of the seismic wave train produced by the seismic disturbance set off by exploding an explosive charge at the shot point. The record strip or film also contains transverse time marking lines at regular intervals, indicating simultaneity on the different traces of the records. The wave train reaching a geophone is however of a very complex nature and contains not only those seismic waves which reach the geophone directly through the surface layers and by reflection, but also contains other waves due to extraneous sources such as moving objects, oscillations set up by the wind etc. The oscillations due to reflection from various subsoil strata are therefore submerged in the flood of oscillations produced the reception of the disturbance and they can only be detected by analysis, which is essentially based on the presence of a plurality of traces, all of which show the influence of the reflection. A reflection would rarely be recognizable on a single trace.

The time within which a reflected oscillation will reach the geophone will of course increase with the depth of the reflecting layer. At the same time as clearly seen in Figure 9 the "step out" or time difference between the arrivals of vibrations or disturbances due to the same reflection on different geophones decreases with the depth of the reflecting layer.

Figure 9:
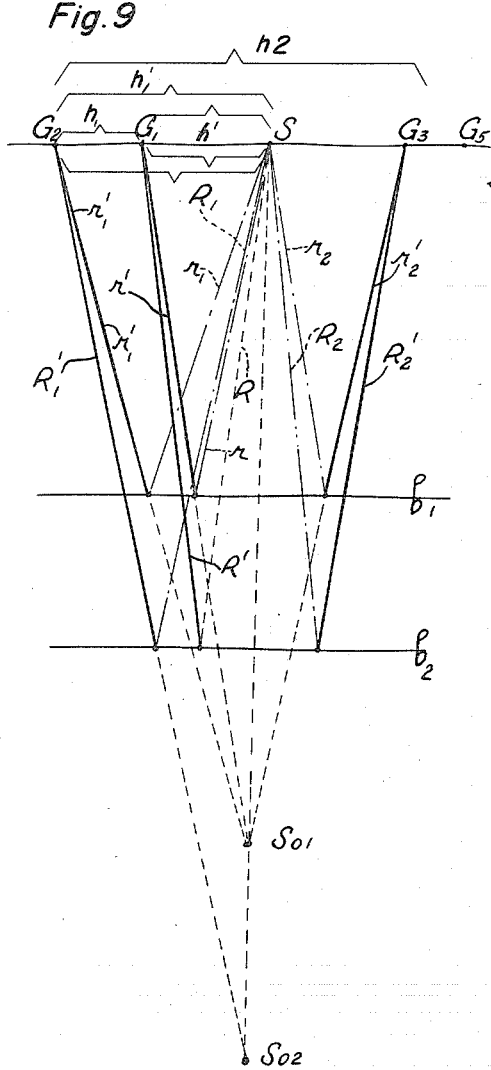
Figure 9 is a diagram illustrating the reflection of a disturbance from boundary layers of geological strata.

This will be clear from Figure 9 in which figure it will be seen that the horizontal component of the reflected wave becomes a smaller and smaller fraction of the total path on which the disturbance travels from shot point to geophone with increasing depth.

Figure 10:
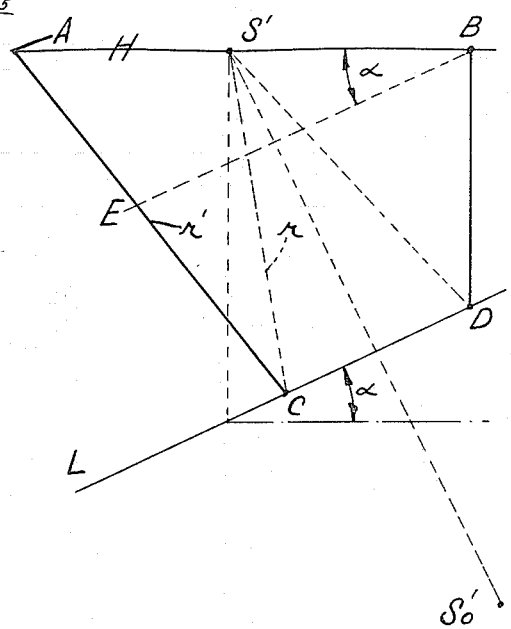
Figure 10 is a similar diagram.

Figures 9 and 10 illustrate this diagrammatically in an idealized manner. A shot point is shown in the figures at S; the reflecting boundary of several layers $b_1$, $b_2$ is also shown in this figure. It is assumed the disturbance travels in straight lines $r$, $r'$; $r_1$, $r_1'$, $r_2$, $r_2'$ . . . . The difference between the total lengths of the rays $r+r'$; $r_1+r_1'$ . . . reaching the geophones along which the disturbance travels and which is due to the horizontal distance $h$, $h_1$, $h_2$. . . between two geophones or due to the difference of the distance from the shot point vertical $h'$, $h_1'$ . . . is obviously much greater for the reflection path $r+r'$, $r_1+r_1'$ . . . than for the reflection path $R+R'$ or $R_1+R_1'$ . . . as this difference is proportional to the ratio of the horizontal and vertical components of the rays which clearly varies and which decreases with increasing depth. The "step out" between the geophones is graphically illustrated by the lines 100, 101 . . . in Figure 8 which have a different inclination towards the line of advance of the record. As reflections from greater depths arrive later, the extent of the "step out" between geophones decreases toward the bottom of the record and the angle between the stepout line, connecting points of arrival of the disturbance reflected from a boundary on the various traces becomes smaller and smaller.

If a reflection is received, the normal "step out" for these depths is known; and the inclination of the actual step out also permits to determine the slope of the reflecting surface especially with a suitable spread of the geophones relative to the shot point. In the diagram illustrated in Figure 10 it is assumed that the boundary L has an inclination towards the horizontal defined by the angle $\alpha$, the geophones in A, B being arranged in a horizontal plane H. If it is assumed that the shot point is S' (supposed to be in the same horizontal plane H for the sake of simplicity) then the disturbance will travel towards the boundary on the ray $r$ and will be reflected from the boundary, the reflecting rays $r'$ apparently originating in the point $S_0'$. The actual "step out" between the geophones A, B will be approximately proportional to the line E—B.

In this modified straight ray method of cross-sectioning a constant velocity is used for the purpose of migrating the reflection. If it is assumed, as above stated, that the reflecting layer L is at an angle $\alpha$ to the horizon and if the energy initiates at the shot point S' and the geophones A, B are assumed to be placed at equal distances from S' then the path of the energy is S'CA and S'DB, respectively. Since the normal step out will be the same for the path S'CA and S'DB and if the times are corrected for elevational angle (if any) and low velocity occurring in the weathered layer near the surface then the dip across the record will be S'CA—S'DB or AE.

$$\text{Sin } \alpha = \frac{AE}{AB}$$

A constant velocity must be used as AE is expressed in time, AB in length units, being a distance. With a constant velocity however $$\text{Sin } \alpha = \frac{(AE) \text{ velocity}}{AB}$$

The angle can thus be computed. All reflections on the record that have the same dip across the record will be plotted with the center line along $S'S_0'$. The relation $$\text{Sin } \alpha = \frac{AE}{AB}$$

is of course not strictly correct since angle AEB is not a right angle. However, since AE is small compared to AB, and since AC or AD are usually much larger than AB the error is negligible.

On the basis of this theoretical background the operation of the device can be easily explained. The operator places the record strip or film on the record board 12 and places a cross-section sheet under the plotting arm and then slides the record board under the pulleys 14, 16 which are held by the bridge of the baseboard. He then aligns the origin or zero point on the record with the zero point on the device. Certain corrections have frequently to be made leading to a computed zero point. As this is, however, not part of this invention, it is assumed that the zero point for the record has been computed or has been fixed when the record strip is placed on the board. The time marks 33 on the record strips are then aligned with the graduations on scale 90 and the heavy mark on or near the point of origin on the record is aligned with the zero point of the graduation. Any slight difference may be corrected by the operation of the key 94 moving the scale 90.

The operator may operate the key with his left hand while his right hand seizes the handle 48 and moves the scanning head over the record strip searching for reflections.

The scanning head template automatically supplies information with respect to the normal "step out" for the particular place on the record to which the template is moved. By scrutinizing the oscillograms with the "step out" well marked by the template, the operator is in a position to detect any reflection which manifests itself on the traces along the step out line and which is characterized not only by the uniformity of the influence on all traces along the line of the "step out" but which is also characterized by a change in the amplitude in all traces due to the arrival of energy from below. The operator, when detecting some signs of a reflection, may easily test whether these signs really correspond to such a reflection by aligning the template with the points on the traces which show the similarity of shape of the oscillations and the change of amplitude. If these points on the traces which show the above characteristics are due to reflection the points will all be positioned along the scanning template. To align the template with the points on the traces which correspond to reflection the template has to be turned by means of the handle by the operator. The rotational or turning movement is transmitted to the plotting arm which turns in proportion in the manner already described. The data on the plotting sheet are thus necessarily in polar coordinates, the radius vector or linear function measuring the total time elapsed.

The angular movement given to the plotting head corresponds to the inclination imparted to the scanning head. It corresponds to the time difference $\Delta t$ between the times of arrival of a reflecting wave at two spaced geophones. If the scanning head has already the shape of the normal step out and therefore needs no angular movement, only the angular deviation of the actual step out from the normal "step out" is measured, and as above explained, provides an angle which is proportional to the slope of the reflecting boundary. As the longitudinal movement of the plotting head is proportional to the longitudinal movement of the scanning head along the record which is in its turn proportional to the time which has elapsed since "time break" the marking along the edge of the plotting head on the cross-section sheet supplies in polar coordinates an exact indication for the depth and inclination of the reflecting layer. The operator thus proceeds scrutinizing the record. He can rapidly detect and mark the reflections from deeper boundaries of layers which he may find on the record.

It will thus be seen that a device according to the invention provides a simple, effective and accurate means for analyzing a record strip, said system and means also supplying all data permitting rapid location of reflections, said data being rapidly and accurately recorded on the cross-section sheet. The analysis is thus greatly simplified and accelerated and many elements adding to the difficulty of the analysis are eliminated.

It will be understood that the device as illustrated can be changed in various manners without in any way departing from the essence of the invention as defined in the annexed claims.

What is claimed as new is as follows:

1. In a system for the analysis of seismographic records containing a plurality of oscillogram traces made by spaced seismo-pickups registering the arrival of elastic waves produced by a source of seismic disturbances in an analyzing device, comprising a scanning head, means for manually guiding said scanning head in substantial parallelism to a record sheet and along said record sheet, a step-out line indicating member carried by and rotatable on the said scanning head, arranged in close proximity to the record sheet, said step-out line indicating member being of variable shape, means for adjusting the shape of said step-out line indicating member, to conform its shape to the normal step-out line connecting the points of arrival for the same disturbance wave at the spaced seismo-pickups, a plotting means including a plotting head and a plotting arm pivoted at one end and carrying the said plotting head, means connecting said scanning head and said plotting head to produce a proportional displacement of the plotting head over a plotting sheet when the scanning head is moved over the record sheet and means for angularly displacing the plotting arm and the plotting head carried by it, in proportion to a manual angular displacement of the scanning head when the step out line indicating member of the said scanning head is aligned with the actually observed step out line.

2. An analyzing device as claimed in claim 1 comprising in addition operating means for said adjusting means of the step-out line indicating member, automatically operating the said adjusting means continuously during the movement of the scanning head over the record, the change of shape of the step-out line indicating member being thus always in proportion to the distance of the last named member from a starting point on the record during the longitudinal movement of the scanning head.

3. An analyzing device as claimed in claim 1 wherein the scanning head carries a spindle, and wherein the step-out line indicating member consists of a leaf spring held at one point by said spindle, and means for bending and tensioning the leaf spring to a varying degree, dependent on the distance of the leaf spring from the starting point.

4. An analyzing device as claimed in claim 1 wherein the scanning head carries a leaf spring forming the step-out line indicating member, said leaf spring being fixed at one point to the scanning head, means for stressing and bending the leaf spring, connected with the same at other points, and means for varying the stress applied to the leaf spring, said means relieving the stress when the scanning head is moved away from the starting position of the scanning head on the record and increasing the stress when the scanning head is moved towards the starting position of the scanning head.

5. An analyzing device as claimed in claim 3 wherein the scanning head is provided with a cam disk, cables running over said cam disk and fixed to the same, said cables being attached to the leaf spring, and means rotating the cam disk upon longitudinal movement of the scanning head along the record.

6. In a system for the analysis of seismographic records containing a plurality of oscillogram traces made by spaced seismo-pickups registering the arrival of elastic waves produced by a source of seismic disturbances in an analyzing device, comprising a baseboard and a record board, the latter adapted to support the seismographic record, a scanning head, means for moving the same longitudinally over said record and means for guiding the scanning head during such movement, a rack fixedly connected with the baseboard, a pinion meshing with the rack, a cam disk, driven by gear wheels meshing with the said pinion, a spindle carried by said scanning head, a leaf spring attached at one point to said spindle, cables attached to said leaf spring for bending the same into a shape which is in conformity with the normal step-out line corresponding to the time of arrival of a seismic disturbance wave at said pickups, said cables being fixed on said cam disk and running over the same so as to be tightened and wound on the cam disk when the scanning head moves towards the starting point of the record, while being released when the scanning head is moved away from the starting point of the record, the scanning head and leaf spring being rotated to align the latter with points on the traces of the record believed to be the record of a reflection, a cross-section sheet placed on said baseboard adjacent to said record board, a plotting sheet, a plotting means including a plotting head, a plotting arm, carrying said plotting head, along which the said plotting head is movable, said arm being pivoted at one end, means connecting said scanning head and said plotting head to produce a proportional displacement of the plotting head over the plotting sheet when the scanning head is moved over the record sheet, and means for angularly displacing the said plotting arm and said plotting head carried by it in proportion to a manual angular displacement of the scanning head imparted to it by aligning the leaf spring carried by said scanning head with the actually observed step out line.

7. In an analyzing device as claimed in claim 6 wherein two pairs of pulleys are arranged on the baseboard, the corresponding pulleys of the two pairs being joined by an endless belt, and wherein one side of the scanning head is attached to one of said belts while the other side of the scanning head is attached to the other continuous belt, a handle for guiding and rotating said scanning head, the latter being thus rotatable by moving the two belts in different directions.

8. An analyzing device as claimed in claim 6 wherein the plotting are is provided with a groove and the plotting head is provided with a feather sliding in the groove, to prevent the said plotting head from rotating when turned by differential movement of the endless belts produced by rotating movement of the scanning head, while imparting an angular movement to the plotting arm around the spindle serving as its pivot.

9. An analyzing device as claimed in claim 7 wherein the scanning head comprises a transverse scanning bar, attached on one side to one of the endless belts and on the other side to the other one of the endless belts joining corresponding pulleys of the two pairs of pulleys, a spindle connecting said scanning bar with the said scanning head, the spindle on the scanning head to which the leaf spring is attached being provided with a toothed sector, and the spindle connecting the scanning bar with the scanning head carrying the handle for the operator and a pinion, gear wheels meshing with said pinion and said toothed segment, the movement of the handle being thus translated into a swing out movement of the leaf spring to an increased angle.

10. An analyzing device as claimed in claim 7 wherein the scanning head comprises a transverse scanning bar, attached on one side to one of the endless belts and on the other side to the other one of the endless belts joining corresponding pulleys of the two pairs of pulleys, a spindle connecting said scanning bar with said scanning head, the spindle on said scanning head to which the leaf spring is attached being provided with a toothed sector, and the spindle connecting the scanning bar with the scanning head carrying the handle by means of which the operator may rotate the scanning bar and scanning head, an exchangeable pinion provided with means for coupling it with the last named spindle, exchangeable gear wheels meshing with said pinion and adapted to rotate around a further spindle carried by said scanning head the movement of the handle being thus translated into a swing out movement of the leaf spring through an angle which is variable according to the size of the changeable pinion connected with the spindles.

11. A system for the analysis of seismographic records containing a plurality of oscillogram traces made by spaced seismo-pickups registering the arrival of elastic waves produced by a source of seismic disturbances, comprising a scanning head longitudinally movable along the seismographic record to be analyzed, said scanning head being also rotatable around an axis at right angles to the seismographic record and being provided with a step-out line indicating member, means for aligning said indicating member with a step-out line connecting points of arrival of the same disturbance waves on different places of the record, a plotting head, means interconnecting the plotting head and scanning head, adapted to move the plotting head over a distance which will bear a predetermined relationship to the longitudinal movement of the scanning head along the record sheet, and further means interconnecting the plotting head and scanning head, adapted to produce a predetermined relationship between the angular displacement of the plotting head and the angular rotation of said scanning head about its axis, so that the plotting head will plot the migrated position of earth strata which cause angular step-out lines on the record.

12. A system for the analysis of seismographic records containing a plurality of oscillogram traces made by spaced seismo-pickups registering the arrival of elastic waves produced by a source of seismic disturbances as claimed in claim 11 wherein said rotatable scanning head includes a slide member on which the step out line indicating member is pivotally mounted, and means for rotating the step out line indicating member around the pivot so as to align it with the actually observed step out line produced by a reflection of the disturbance wave from inclined boundaries.

13. A system for the analysis of seismographic records containing a plurality of oscillogram traces made by spaced seismo-pickups registering the arrival of elastic waves produced by a source of seismic disturbances as claimed in claim 12, comprising means for varying the shape of the step-out line indicating member carried by the scanning head, said means changing the shape of said step-out line indicating member continuously during the movement of the scanning head over the record so as to conform this shape to the distance over which the scanning head has been moved which corresponds to the time which has elapsed since the starting of the seismic disturbance.

14. A system for the analysis of seismograph records containing a plurality of oscillogram traces made by spaced seismo-pickups registering the arrival of elastic waves produced by a source of seismic disturbances, comprising a scanning head longitudinally movable along the seismographic record to be analyzed, said scanning head being also rotatable around an axis at right angles to the seismographic record, being provided with a step-out line indicating member, means for aligning said indicating member with a step-out line, connecting points of arrival of the same disturbance waves on different traces of the record, a plotting arm, said plotting arm being pivoted at one end, a plotting head, said plotting head being carried on the plotting arm, means connecting said scanning head and plotting head producing a displacement of the plotting head along said plotting arm which is proportional to the longitudinal movement of the scanning head along the seismographic record sheet, and means for angularly displacing the plotting arm and the plotting head carried by it in proportion to the angular displacement of the scanning head around the axis around which it is rotatable when the step-out line indicating member of the scanning head is aligned with the actual observer step-out line.

15. A system for analysis of seismographic records containing a plurality of oscillogram traces made by spaced seismo-pickups registering the arrival of elastic waves produced by a source of seismic disturbances, comprising a first axis, a second axis parallel to the first axis, means for mounting a seismographic record between said axes, a scanning head longitudinally movable along the record to be analyzed, two independently rotatable pulleys on each of said axes, an endless belt connecting a pulley on the first axis to a pulley on the second axis, and a second endless belt connecting the second pulley on the first axis to the second pulley on the second axis, one side of said scanning head being connected to one of said endless belts and on the other side to the other of said endless belts, a third and fourth pulley mounted for rotation on the second axis, said third pulley being connected to said first pulley and the fourth pulley being connected to the said second pulley, a plotting arm pivoted to said second axis, a fifth and sixth pulley mounted for rotation about an axis mounted on the other end of said arm, an endless belt around said third and fifth pulley, another endless belt around said fourth and sixth pulley, a plotting head on said plotting arm, one side of said plotting head being connected with the belt connecting the third and fifth pulley and the other side of said plotting head being connected to the belt around said fourth and sixth pulley, the connecting of the plotting head producing a proportional relationship between the translational longitudinal movement of the scanning head and the radial movement of the plotting head and the proportional relationship between the angular movement of the scanning head and the angular movement of the plotting arm about the said second axis.

References Cited in the file of this patent

UNITED STATES PATENTS

| | | |
|---|---|---|
| 2,217,720 | Anderson | Oct. 15, 1940 |
| 2,243,730 | Ellis | May 27, 1941 |
| 2,427,421 | Rieber | Sept. 16, 1947 |
| 2,440,971 | Palmer | May 4, 1948 |
| 2,686,633 | Hale | Aug. 17, 1954 |